(12) United States Patent
Cheng

(10) Patent No.: US 6,593,564 B2
(45) Date of Patent: Jul. 15, 2003

(54) PHOTO SWITCHING DEVICE HAVING A CONTROL CIRCUIT WITH A GATE CONTROLLED DEVICE

(76) Inventor: Ching Chi Cheng, 9F, No. 250-1, Section 2, Jin Cheng Road, Tucheng City, Taipei (TW)

( * ) Notice: Subject to any disclaimer, the term of this patent is extended or adjusted under 35 U.S.C. 154(b) by 179 days.

(21) Appl. No.: 09/903,649

(22) Filed: Jul. 13, 2001

(65) Prior Publication Data

US 2003/0010901 A1 Jan. 16, 2003

(51) Int. Cl.[7] ............................................. H01J 40/14
(52) U.S. Cl. ......................... 250/214 LS; 250/214 AZ
(58) Field of Search .................. 250/214 LS, 214 AL, 250/214 D, 214 SG, 214 C, 214 RC, 214 SW, 214 R; 327/514, 517, 519, 520; 315/121, 127, 134–136

(56) References Cited

U.S. PATENT DOCUMENTS 4,658,129 A * 4/1987 Fan ......................... 250/214 R

* cited by examiner

*Primary Examiner*—Que T. Le
(74) *Attorney, Agent, or Firm*—Rosenberg, Klein & Lee

(57) ABSTRACT

A photo switching device includes first and second terminals respectively coupled to a power source and a load. A bi-directional current routing circuit including a rectifying bridge is connected to the first and second terminals to receive electricity from the first and second terminals and has positive and negative output terminals. A switching/driving circuit is connected between the positive and negative output terminals for selectively conducting an output current of the bi-directional current routing circuit from the positive output terminal to the negative output terminal. The switching/driving circuit includes a silicon controlled switching device having a gate coupled to and controlled by a controlling circuit to switch between open condition and closed condition. The controlling circuit includes a photo detecting device connected to a gate of a gate controlled device. The gate controlled device has an output coupled to and controlling the gate of the silicon controlled switching device.

20 Claims, 3 Drawing Sheets

PHOTO SWITCHING DEVICE HAVING A CONTROL CIRCUIT WITH A GATE CONTROLLED DEVICE

FIELD OF THE INVENTION

The present invention generally relates to a photo switching device, and in particular to a photo switching device capable to take both alternate current and direct current and operable based on the luminance of the surroundings.

BACKGROUND OF THE INVENTION

Lamps or other lighting devices are widely used to illuminate dark surroundings. Most of the lighting devices available in the market are powered by electricity. It often desired to turn off the lighting devices when the surroundings are bright, such as in the day time. This is particularly true for outdoor lighting devices for they must be turned off in the day time while turned on in the night time. An automatic switching/controlling device for the outdoor lighting device is of substantial importance in this respect.

Automatic switching devices are available in the market. However the conventional switching devices are only operable with a specific type of electricity. For example, a switching device that is designed for direct current can not take alternate current. This is because that rectifying and transforming means is required for an alternate current based switching device. The rectifying and transforming means not only complicates the overall construction of the switching device but also increases costs. Furthermore, the rectifying and transforming means makes the overall size of the switching device bulky. Such a bulky size makes it impossible to integrate itself with a control circuit of a lamp string or other lighting devices and must be provided in an independent, separate form.

Furthermore, in case that a lighting device is replaced by another one operable with different type of electricity, the switching device of the lighting device must be replaced to suit said another one of lighting device. This adds costs of part and installation to the overall expenses and limits the utilization of a specific lighting device.

It is thus desirable to provide an automatic switching device for overcoming the above-discussed problems.

SUMMARY OF THE INVENTION

Accordingly, an object of the present invention is to provide a photo switching device for a lighting device capable to take both alternate current and direct current of different voltages.

Another object of the present invention is to provide a photo switching device comprising no transformer means thereby significantly reducing the overall size and costs thereof.

A further object of the present invention is to provide a photo switching device which is capable to work with different types of lighting devices operated with different power sources.

In accordance with the present invention, a photo switching device comprises first and second terminals respectively coupled to a power source and a load. A bi-directional current routing circuit comprising a rectifying bridge is connected to the first and second terminals to receive electricity from the first and second terminals and has positive and negative output terminals. A switching/driving circuit is connected between the positive and negative output terminals for selectively conducting an output current of the bi-directional current routing circuit from the positive output terminal to the negative output terminal. The switching/driving circuit comprises a silicon controlled switching device having a gate coupled to and controlled by a controlling circuit to switch between open condition and closed condition. The controlling circuit includes a photo detecting device connected to a gate of a gate controlled device. The gate controlled device has an output coupled to and controlling the gate of the silicon controlled switching device. When the photo detecting device detects surrounding light, the output of the gate controlled device is switched from a logic high state to a logic low state which in turn changes the silicon controlled switching device from the closed condition to the open condition thereby cutting off the output current from the positive output terminal to the negative output terminal. A variable resistor is connected in serial to the photo detecting device for sensitivity adjustment. A voltage regulation circuit is combined with the controlling circuit in parallel with the photo detecting device for voltage regulation purposes.

BRIEF DESCRIPTION OF THE DRAWING

The present invention will be apparent to those skilled in the art by reading the following description of a preferred embodiment thereof, with reference to the drawings, wherein.

DETAILED DESCRIPTION OF THE PREFERRED EMBODIMENT

Figure 1:
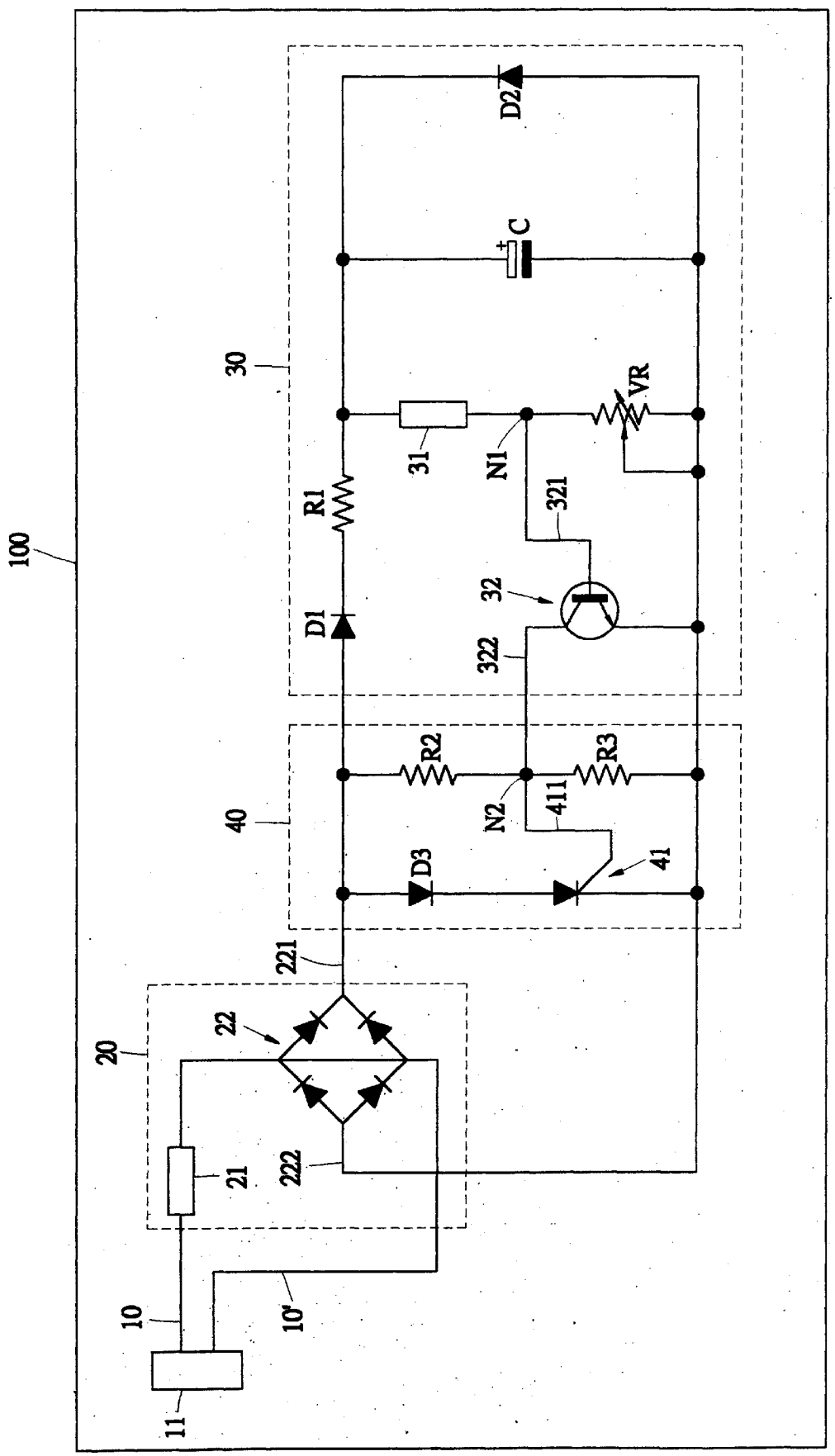
FIG. 1 is a circuit diagram of a photo optical switching device constructed in accordance with the present invention.

With reference to the drawings and in particular to FIG. 1, a photo switching device constructed in accordance with the present invention, generally designated with reference numeral 100, comprises a pair of input terminals 10, 10' for respectively connection with a power source and a load, such as a lighting device. In the embodiment illustrated, a connector 11 is formed retaining the terminals 10, 10' together for simplifying the overall configuration and enhance utilization thereof. The input terminals 10, 10' are connected to a bi-directional current routing means 20 which is in turn coupled to a switching/driving means 40 controlled by a controlling means 30.

The bi-directional current routing means 20 of the photo switching device 100 comprises a bi-directional current routing circuit 22 which in the embodiment illustrated comprises a rectifying bridge circuit comprised of four diodes having a positive output terminal 221 and a negative output terminal 222 and a protection element 21, such as a fuse, connected between the circuit 22 and the terminal 10 for over-current protection. The bi-directional current routing circuit 22 functions to receive currents from either direction and provides a unidirectional output current to the switching/driving means 40. In the embodiment illustrated, no matter the input current is an alternate current having a positive half cycle and a negative half cycle or a direct current, the output current always goes from the positive output terminal 221 of the circuit 22 to the negative output terminal 222.

The controlling means 30 comprises a diode D1 and a resistor R1 connected to the positive output terminal 221 of the bi-directional current routing means 20 to receive the output current from the bi-directional current routing means 20. The diode D1 serves to prevent reverse current. A voltage regulation device comprising a Zener diode D2 and a capacitor C in parallel connection with each other is connected between the resistor R1 and the negative output terminal 221 of the bi-directional current routing means 20. A photo detecting device 31 and a variable resistor VR connected in serial with each other is connected between the resistor R1 and the negative output terminal 221 of the bi-directional current routing means 20 and thus in parallel with the voltage regulation device. A node N1 between the photo detecting device 31 and the variable resistor VR is connected to a gate 321 of a gate controlled device 32. In the embodiment illustrated, the photo detecting device 31 is a photo-sensitive resistor. However, other photo detecting devices, such as photo transistor, photo diode and photo SCR (Silicon Controlled Rectifier) may also be employed equally. The gate controlled device 32 may be any known thyristor, such as NPN transistor as shown in the drawing and SCR.

The photo detecting device 31 detects surrounding light. In the day time, the photo detecting device 31 has a resistance that is lowered down upon detecting the surrounding light. A bias is thus established in the gate 321, switching the gate controlled device 32 to an "ON" state. An output 322 of the gate controlled device 32 is thus in a relatively low voltage, namely a logic low state. In the night time, no surrounding light is detected by the photo detecting device 31 and thus the resistance of the photo detecting device 31 is maintained high. No bias can be obtained at the gate 321 of the gate controlled device 32 whereby the gate controlled device 32 is switched to an "OFF" state. Thus, the output terminal 322 of the gate controlled device 32 is in a logic high state.

The variable resistor VR can be used to manually set sensitivity to the switching of the gate controlled device 32 between "ON" and "OFF" states.

The switching/driving means 40 is connected between the positive and negative output terminals 221, 222 of the bi-directional current routing means 20. In the embodiment illustrated, the switching/driving means 40 comprises a voltage division circuit comprising resistors R2 and R3 connected in serial between the positive and negative output terminals 221, 222. A node N2 between the resistors R2 and R3 is connected to the output 322 of the gate controlled device 32. A diode D3, functioning to prevent reverse current, and a silicon controlled switching device 41, which in the embodiment illustrated is an SCR having a gate 411, are connected in serial between the positive and negative output terminals 221, 222 of the bi-directional current routing means 20. The gate 411 of the silicon controlled switching device 41 is connected to the node N2 whereby the silicon controlled switching device 41 is controlled by the output 322 of the gate controlled device 32. In other words, when the gate controlled device 32 is in the "ON" state, the silicon controlled switching device 41 is turned off and thus in an "open" state, cutting off the output current of the bi-directional current routing means 20 from the positive output terminal 221 to the negative output terminal 222. When the gate controlled device 32 is in the "OFF" state, the silicon controlled switching device 41 is turned on and thus in a "closed" state, allowing the output current of the bi-directional current routing means 20 to flow from the positive output terminal 221 to the negative output terminal 222.

Besides an SCR, the silicon controlled switching device 41 can also be embodiment with other equivalent elements, such as a transistor.

Figure 2:
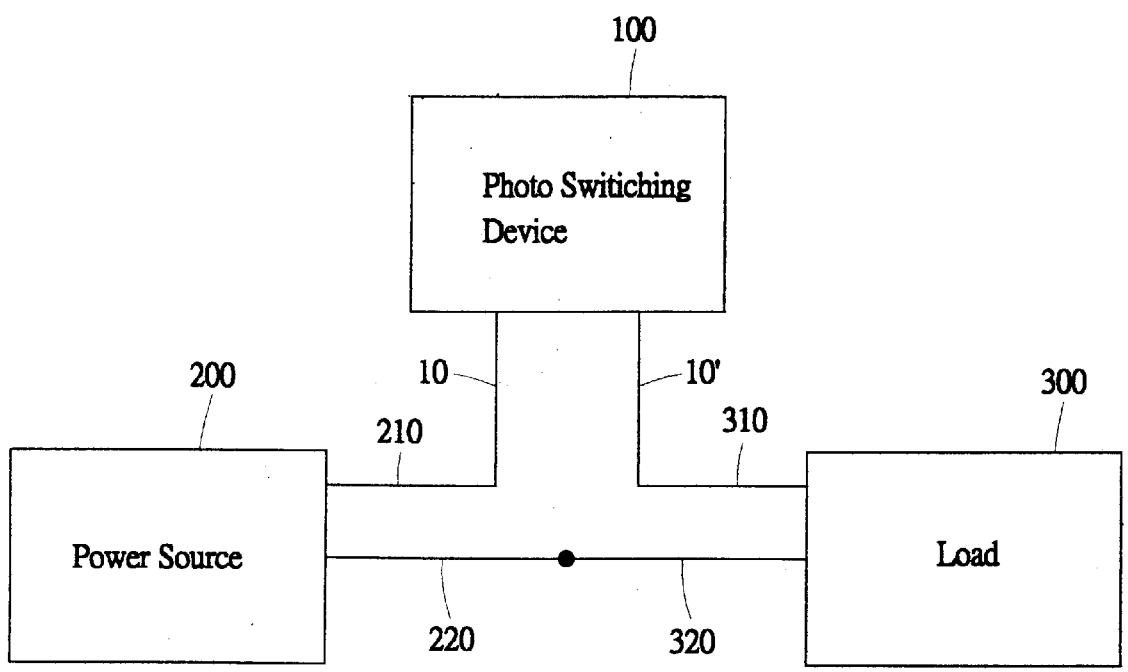
FIG. 2 is a block diagram showing an application of the photo switching device of the present invention.

Also referring to FIG. 2, in a practical operation, the photo switching device 100 of the present invention is connected between a power source 200 and a load 300 by means of the input terminals 10, 10'. The power source 200 can be any suitable power source of different types and different voltages. A wall outlet is an example of the power source 200. Another example is a power supply and control device of a lamp string. The load 300 can be any lighting devices or lamp strings operated with alternate current or direct current. An example of the connection among the photo switching device 100, the power source 200 and the load 300 is done by respectively coupling the terminals 10, 10' to a terminal 210 of the power source 200 and a terminal 310 of the load 300. Another terminal 220 of the power source 200 is directly connected to another terminal 320 of the load 300. The operation of the photo switching device 100 based on the lighting condition of the surroundings controls the supply and cut-off of electricity from the power source 200 to the load 300. Namely, in the current application, power supplied to the load 300 is cut off during the day time while power is supplied to the load 300 in the night time. This will be further described.

In case that the power source 200 supplies an alternate current, in the positive half cycle of the alternate current, the current from the power source 200 into the photo switching device 100 sequentially flows through the terminal 10, the over-current protection device 21, the positive output terminal 221 of the bi-directional current routing means 20, the diode D3, the silicon controlled switching device 41, the negative output terminal 222 of the bi-directional current routing means 20, and the terminal 10' and is then directed to the load 300. In the negative half cycle of the alternate current, the current from the power source 200 into the photo switching device 100 sequentially flows through the terminal 10', the positive output terminal 221 of the bi-directional current routing means 20, the diode D3, the silicon controlled switching device 41, the negative output terminal 222 of the bi-directional current routing means 20, the over-current protection device 21 and the terminal 10 and is then directed to the load 300. Thus, the power supplied to the load 300 can be maintained the same regardless positive or negative half cycle of the alternate current.

In case that the power source 200 supplies a direct current, the path of the direct current is identical to either the positive half cycle or the negative half cycle of an alternate current discussed above. Thus, the photo switching device 41 of the present invention can be operated in both alternate current and direct current.

Figure 3:
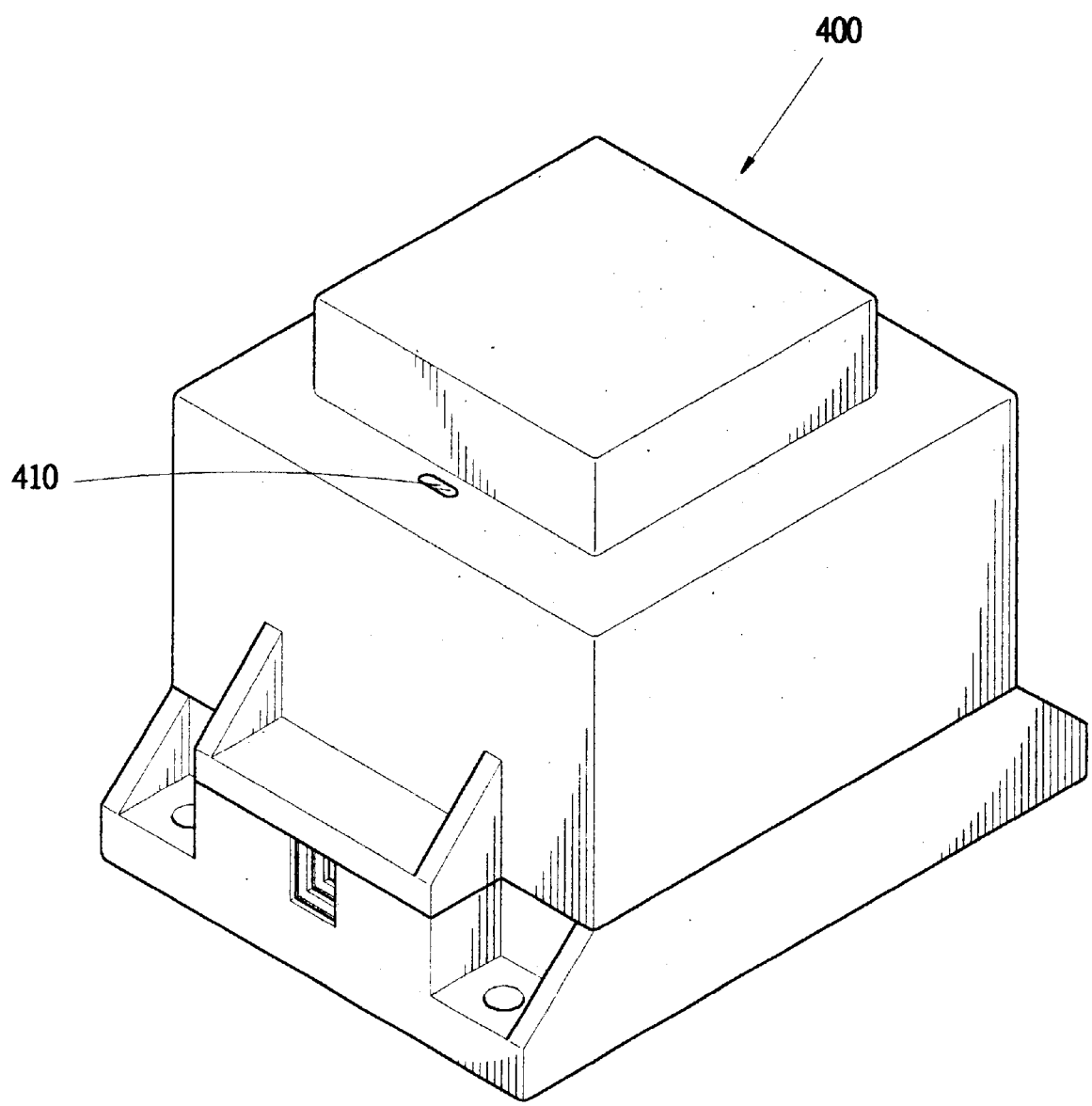
FIG. 3 is a perspective view showing the photo switching device of the present invention integrally combined with a lamp control circuit and enclosed together in a common housing.

Also referring to FIG. 3, since the photo switching device 100 of the present invention comprises no transformer, the overall size thereof can be made relatively small. It is possible to integrate or combine the photo switching device 100 with a control circuit of a lamp string or lighting device. For example, the control circuit of a lamp string usually comprises a power supplying means, which may be regarded as the power source 200 of FIG. 2, and the photo switching device 100 may be combined with such a power supplying means of the lamp control circuit. Preferably, the circuits of the power supplying means and that of the photo switching device 100 are integrated with each other and enclosed in a common housing 400. The housing 400 is provided with a window or a light transmitting opening 410 through which surrounding light can be projected onto the photo detecting device 31 for the detection of the surrounding light.

In view of the above description, the photo switching device 100 of the present invention offers the following advantages:

(1) The photo switching device of the present invention can be operated with both alternate current and direct current.

(2) The photo switching device of the present invention comprises no electrical transformer whereby the overall size thereof is relatively small. The photo switching device can be combined with a control circuit of a lighting device for construction simplicity and cost reduction.

(3) Since the photo switching device of the present invention can be integrated with a lamp control circuit as a single unit, no installation of additional circuit or wire arrangement is required. The installation of lighting devices can be simplified and enhanced.

(4) Since the operation of the photo switching device is independent of the type of the electrical current powering it, it is compatible with all kinds of different lighting devices and all sorts of power sources.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A photo switching device comprising:
   first and second input terminals adapted to be coupled to a power source and a load respectively;
   a bi-directional current routing circuit coupled to the first and second input terminals for receiving a current from the first and second input terminals and routing an output current from a positive output terminal to a negative output terminal;
   a controlling circuit connected between the positive and negative output terminals of the bi-directional current routing circuit, comprising a photo detecting device coupled to a gate of a gate controlled device whereby, upon detecting light, the photo detecting device switches an output of the gate controlled device from a logic high state to a logic low state, and upon removing the light, the photo detecting device switches the output of the gate controlled device from the logic low state to the logic high state;
   a switching/driving circuit connected between the positive and negative output terminals of the bi-directional current routing circuit, comprising a silicon controlled switching device having a gate coupled to and controlled by the output of gate controlled device whereby when the output of the gate controlled device is switched from the logic high state to the logic low state, the silicon controlled switching device is switched from a closed condition to an open condition, cutting off the output current from the positive output terminal to the negative output terminal of the bi-directional current routing circuit, and when the output of the gate controlled device is switched from the logic low state to the logic high state, the silicon controlled switching device is switched from the open condition to the closed condition, allowing the output current to flow from the positive output terminal to the negative output terminal of the bi-directional current routing circuit.

2. The photo switching device as claimed in claim 1, wherein the first and second input terminals are retained in a connector.

3. The photo switching device as claimed in claim 1, wherein the bi-directional current routing circuit comprises a rectifying bridge circuit.

4. The photo switching device as claimed in claim 1, wherein the bi-directional current routing circuit comprises an over-current protection device.

5. The photo switching device as claimed in claim 4, wherein the over-current protection device comprises a fuse.

6. The photo switching device as claimed in claim 1, wherein the controlling circuit comprises a diode for preventing reverse current.

7. The photo switching device as claimed in claim 1, wherein the controlling circuit comprises a voltage regulation circuit comprised of a Zener diode and a capacitor.

8. The photo switching device as claimed in claim 1, wherein the con trolling circuit comprises a variable resistor connected in serial with the photo detecting device, a node between the variable resistor and the photo detecting device being coupled to the gate of the gate controlled device.

9. The photo switching device as claimed in claim 1, wherein the photo detecting device of the controlling circuit comprises a photo-sensitive resistor.

10. The photo switching device as claimed in claim 1, wherein the photo detecting device of the controlling circuit comprises a photo diode.

11. The photo switching device as claimed in claim 1, wherein the photo detecting device of the controlling circuit comprises a photo transistor.

12. The photo switching device as claimed in claim 1, wherein the photo detecting device of the controlling circuit comprises a photo SCR.

13. The photo switching device as claimed in claim 1, wherein the gate controlled device of the controlling circuit comprises a transistor.

14. The photo switching device as claimed in claim 1, wherein the gate controlled device of the controlling circuit comprises an SCR.

15. The photo switching device as claimed in claim 1, wherein the switching/driving circuit comprises a voltage division circuit comprised of two serially connected resistors, a node between the resistors being coupled to the gate of the silicon controlled switching device and the output of the gate controlled device.

16. The photo switching device as claimed in claim 1, wherein the switching/driving circuit comprises a diode for preventing reverse current.

17. The photo switching device as claimed in claim 1, wherein the silicon controlled switching device of the switching/driving circuit comprises a transistor.

18. The photo switching device as claimed in claim 1, wherein the silicon controlled switching device of the switching/driving circuit comprises an SCR.

19. The photo switching device as claimed in claim 1, wherein the first and second terminals, the bi-directional current routing circuit, the controlling circuit and the switching/driving circuit are adapted to be combined with a lamp control circuit and enclosed in a common housing.

20. The photo switching device as claimed in claim 19, wherein the housing defines an opening for exposing the photo detecting device to surrounding light.

* * * * *